April 7, 1970  A. J. WOOD ET AL  3,505,037
HYPEREUTECTIC SILICON ALLOYS
Filed April 12, 1968
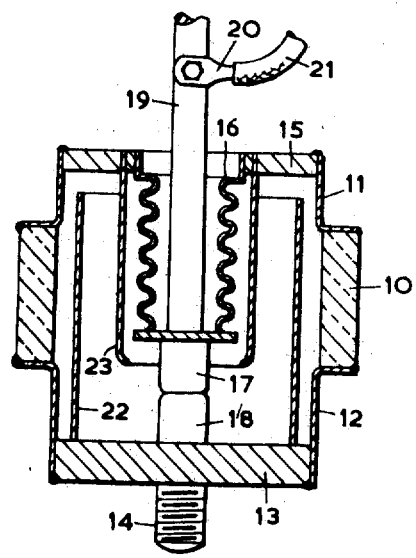

3,505,037
HYPEREUTECTIC SILICON ALLOYS
Allan John Wood and William John Holland, Stafford,
England, assignors to The English Electric Company
Limited, London, England, a British company
Filed Apr. 12, 1968, Ser. No. 720,906
Claims priority, application Great Britain, Apr. 24, 1967,
18,665/67
Int. Cl. B22f 3/16
U.S. Cl. 29—182.5                                    6 Claims

ABSTRACT OF THE DISCLOSURE

A process for producing an alloy of silver, copper, aluminium or gold with silicon, particularly such alloys in which the proportion of silicon exceeds the eutectic proportion, wherein the constituents of the alloy are mixed together in powder form, the mixed powder is pressed into a preform and the preform is sintered at a temperature which is less than the eutectic temperature. Preferably the sintering temperature is between 5° C. and 70° C. less than the eutectic temperature. An alloy made by this process is suitable for use as a vacuum switch contact material.

---

This invention relates to alloys.

If an alloy of silver, copper, aluminium or gold with silicon is prepared by the method of melting the pure metals in a crucible and casting the resultant melt, the resultant alloy, especially one in which the proportion of silicon is equal to, or greater than that corresponding to the eutectic composition, has the disadvantage that it is difficult to machine because it includes large flakes of primary silicon which are extremely brittle and which fracture and break away from the surface when exposed by a machine tool. Furthermore, because of the large differences in density between silicon on the one hand and silver, copper or gold on the other hand, those alloys including copper, silver or gold also have the disadvantage that they tend to form cavities in which gas may be trapped. Such cavities are formed because the large flakes of primary silicon, which are formed first, float on the remainder of the molten metal of the alloy and thus hinder normal shrinkage and the escape of gases.

If sodium is added to the molten metal from which an aluminium silicon alloy as prepared by the above method is cast, the sodium prevents the formation of the large flakes of primary silicon.

However, an alloy including sodium as a constituent would not be suitable for use as a contact material for an electric vacuum switch.

One object of this invention is to provide a process for producing an alloy of silver, copper, aluminium or gold with silicon, especially an alloy wherein the proportion of silicon is equal to or greater than that corresponding to the eutectic composition, and which is suitable for use as a contact material in an electric vacuum switch.

Another object of this invention is to provide a process for producing an alloy of silver, copper, aluminium or gold with silicon, especially an alloy wherein the proportion of silicon is equal to or greater than that corresponding to the eutectic composition, which is readily machineable and which is substantially homogeneous.

A further object of this invention is to provide a process for producing an alloy of silver, copper, aluminium or gold with silicon, especially an alloy wherein the proportion of silicon is equal to, or greater than that corresponding to the eutectic composition, which does not include large brittle flakes of primary silicon.

Yet a further object of this invention is to provide an alloy of silver, copper, aluminium or gold with silicon, the proportion of silicon being equal to, or greater than that corresponding to the eutectic composition.

According to the present invention in one aspect, alloys of a metal selected from the group consisting of silver, copper, aluminium and gold with silicon are made by mixing the metal in powder form with silicon in powder form; compacting the mixed powder into a preform; and sintering the preform at a high temperature which is less than the corresponding eutectic temperature.

Such a process may conveniently be used to produce hypereutectic silicon alloys, i.e. alloys in which the proportion of silicon is at least equal to that corresponding to the eutectic composition.

Preferably the preform is sintered at a temperature which is between 5° C. and 70° C. less than the eutectic temperature.

Preforms intended for use in an electric vacuum switch are sintered in a vacuum. The longer the preform is sintered in a vacuum, the more the structure of the preform is improved and the more the gas content of the preform is reduced. The ultimate limits of sintering time are probably related to the loss of material by evaporation in a vacuum.

One embodiment of this invention will now be described by way of example with reference to the accompanying drawing which is a schematic diagram of an electric vacuum switch.

Referring to the drawing, the electric vacuum switch has a sealed envelope of metal and ceramic construction, including a hollow cylindrical ceramic insulator 10 to which metal cylinders 11, 12 are sealed at opposite ends. The cylinder 12 has welded to it a metal baseplate 13 with an integral stud 14 which serves as one terminal of the switch. A metal ring 15 is welded to the cylinder 11 and a vacuum-tight bellows extends between the central opening in this ring 15 and a moving contact 17, and is welded both to the ring and to the moving contact. The latter co-operates with a fixed contact 18 attached to the baseplate 13. The contact 17 is provided with a control rod 19 operated by an actuator (not shown). A flexible lead 21 from the other terminal of the interrupter is connected to the control rod 19 by a cable lug 20. In order to prevent deposition of conductive material on the insulator 10 due to condensation of metallic vapour, or due to sputtering, a metal shield 22 is interposed between it and the contacts 17, 18. A similar shield 23 surrounds the bellows 16 to prevent its deterioration due to arc running.

The contact surface of the moving contact 17 may conveniently be formed of a hypereutectic silver-silicon alloy. Such an alloy has been made by the following process.

Pure silver powder and pure silicon powder were thoroughly mixed in the proportions 90 percent silver and 10 percent silicon by weight. The resulting mixture was compacted in a press at a pressure of 10 tons/sq. in., to result in a preform which maintains its shape during normal handling. The resulting preform was transferred to an oven. The interior of the oven was evacuated and the temperature of the oven was raised to 790° C. and held for 45 minutes to sinter the preform. The resulting alloy, which is a sintered mixture of silver powder and silicon powder, was substantially homogeneous.

A similar method may be used to produce hypereutectic copper-silicon alloys, aluminum-silicon alloys or gold-silicon alloys which may all be employed in place of the hypereutectic silver silicon alloy in contact 17. It will be understood that this method is not limited to the production of hypereutectic alloys of silver, copper, aluminum or gold with silicon, it may be employed to produce corresponding eutectic alloys.

The eutectic compositions of silver and silicon referred to is that which occurs at 855° C. and approximately 3.8% by weight of silicon, whilst in the case of copper-silicon alloys, the eutectic compositions referred to is that which occurs at 802° C. and approximately 16% by weight of silicon.

The sintering temperature employed in this process is chosen so as to be as high as is reasonably possible, in order to obtain the maximum sintering effect, whilst being less than the eutectic temperature of the alloy in question. By ensuring that the sintering temperature is less than the eutectic temperature, no melting of the constituents of the mixture being sintered occurs, so that crystallization is avoided and the likelihood of the formation of large primary silicon flakes is reduced. The sintering temperature is preferably chosen so as to be between 5° C. and 70° C. less than the corresponding eutectic temperature. The particles of the sintered alloy are bonded together by diffusion.

The sintering time may exceed 45 minutes, there is no reason why sintering for many hours should not be successful. Vacuum sintering is employed for material intended for use in vacuum switches so as to minimise the gases or voids in the materials. The vacuum level for such vacuum sintering should be at least $10^{-4}$ torr. Because silicon is a chemically reactive metal, poorer vacuum levels wold be inadvisable. Superior vacuum levels may be used, although a greater loss of material by evaporation would occur and the sintering time would probably be affected.

The surface of the fixed contact 18 may be formed of a dissimilar material as is described and claimed in our co-pending patent application No. 23,781/66. Tests on a vacuum switch having such a pair of dissimilar contacts, where one of the contacts had a contact surface formed of a hypereutectic silver-silicon alloy produced by the method of this invention, showed that the strength of the weld formed between the two contacts during operation of the switch was of the order of 200 lbs. A similar test on a vacuum switch, in which the only difference was that the hypereutectic silver-silicon alloy was replaced by an eutectic silver-silicon alloy, showed that the strength of the weld formed between the two contacts during operation was of the order of 400 lbs. It will be appreciated that it is undesirable for a co-operating pair of vacuum switch contacts to tend to form high-strength welds between themselves during operation. These tests also suggest that hypereutectic silver-silicon alloys produced by the process of this invention have the typical low-current chopping level and wear rate features of silver-based contacts materials in general.

We claim:
1. An alloy consisting of silicon, free of large primary flakes of silicon, with a metal selected from the group consisting of silver, copper and gold produced by mixing said metal in powder form with silicon powder in hypereutectic quantity, compacting the mixture to form a preform and sintering the preform in a vacuum at a high temperature below the corresponding eutectic temperature of the mixture.
2. An alloy according to claim 1 wherein the vacuum level is at least $10^{-4}$ torr.
3. An alloy according to claim 1 wherein said high temperature is between 5° C. and 70° C. less than said eutectic temperature.
4. A vacuum switch contact of an alloy consisting of silicon, free of large primary flakes of silicon, with a metal selected from the group consisting of silver, copper and gold produced by mixing said metal in powder form with silicon powder in hypereutectic quantity, compacting the mixture to form a preform and sintering the preform in a vacuum at a high temperature below the eutectic temperature of the mixture.
5. A vacuum switch contact according to claim 4 wherein the vacuum level is at least $10^{-4}$ torr.
6. A vacuum switch contact according to claim 4 wherein said high temperature is between 5° C. and 70° C. less than said eutectic temperature.

References Cited

UNITED STATES PATENTS

| | | | |
|---|---|---|---|
| 2,988,806 | 6/1961 | Adams | 75—201 X |
| 2,992,474 | 7/1961 | Adams | 75—201 X |
| 3,009,809 | 11/1961 | Neri | 29—182.5 X |
| 3,319,134 | 5/1967 | Csakvary | 29—182.5 X |
| 3,325,279 | 6/1967 | Lawrence | 29—182.5 X |
| 3,333,579 | 8/1967 | Shockley | 75—143 XR |

FOREIGN PATENTS

| | | |
|---|---|---|
| 1,035,911 | 8/1958 | Germany. |

OTHER REFERENCES

"Treatise on Powder Metallurgy," Interscience Publishers, Goetzel, vol. I, 1949, p. 470; vol. II, 1950, pp. 727–729.

BENJAMIN R. PADGETT, Primary Examiner

A. J. STEINER, Assistant Examiner

U.S. Cl. X.R.

75—160, 201